United States Patent [19]

Erman et al.

[11] Patent Number: 4,775,206

[45] Date of Patent: Oct. 4, 1988

[54] SEPARATION STRUCTURE, OPTICAL SWITCHING ELEMENT INCLUDING SUCH STRUCTURES AND OPTICAL SWITCHING MATRIX CONSTITUTED BY THESE SWITCHING ELEMENTS

[75] Inventors: Marko Erman, Paris; Nakita Vodjdani, La Queue-en-Brie; Jean-Bernard Theeten, Ozoir-la-Ferriere, all of France

[73] Assignee: U.S. Philips Corp., New York, N.Y.

[21] Appl. No.: 882,316

[22] Filed: Jul. 7, 1986

[30] Foreign Application Priority Data

Jul. 11, 1985 [FR] France ................ 85 10640

[51] Int. Cl.[4] .................................................. G02B 6/10
[52] U.S. Cl. ........................... 350/96.13; 350/96.12; 350/96.15; 350/96.16; 350/374; 350/395; 350/96.14
[58] Field of Search ............... 350/96.10, 96.11, 96.12, 350/96.13, 96.14, 96.16, 96.15, 96.30, 370, 374, 394, 395

[56] References Cited

U.S. PATENT DOCUMENTS

| | | | |
|---|---|---|---|
| 3,920,314 | 11/1975 | Yajima | 350/96.12 |
| 3,980,392 | 9/1976 | Auracher | 350/96.14 X |
| 4,153,329 | 5/1979 | Gillette | 350/96.13 |
| 4,415,227 | 11/1983 | Unger | 350/96.15 |
| 4,580,873 | 4/1986 | Levinson | 350/96.13 |
| 4,630,883 | 12/1986 | Taylor et al. | 350/96.16 X |
| 4,652,077 | 3/1987 | Erman et al. | 350/96.13 |
| 4,674,829 | 6/1987 | Bulmer et al. | 350/96.14 |
| 4,689,585 | 8/1987 | Sequeira | 350/96.14 X |
| 4,696,059 | 9/1987 | MacDonald et al. | 350/96.13 X |
| 4,707,057 | 11/1987 | Takahashi et al. | 350/96.12 |
| 4,708,423 | 11/1987 | Erman et al. | 350/96.15 |
| 4,709,978 | 12/1987 | Jackel | 350/96.14 |
| 4,730,884 | 3/1988 | Seino et al. | 350/96.14 |

OTHER PUBLICATIONS

Neyer et al., "Single-Mode Electrooptic X-Switch . . . . Networks", 2nd Eur. Conf. on Int. Opt., pub. Oct. 17–18 1983, pp. 136–139.
Auracher et al., "New Directional Coupler for Integrated Optics", J of Applied Phys. vol. 45 No. 11 Nov. 1974, pp. 4997–4999.
Vincent et al., "$TM_o$–$TE_o$ Conversion in Birefringent . . . . . ", J. of the Opt. Soc. Am. vol. 70 No. 10 Oct. 80, pp. 1222–1229.
Yap et al., "Passive Ti:$LiNbO_3$ Channel Waveguide . . . . ", Appl. Phys. Lett. vol. 44 No. 6 3/84, pp. 583–585.
Hunsperger, "Integrated Optics: Theory and Technology", 2nd Ed, Springer-Verlag 1984, pp. 35–37.

Primary Examiner—William L. Sikes
Assistant Examiner—Brian M. Healy
Attorney, Agent, or Firm—Thomas A. Briody; Jack E. Haken

[57] ABSTRACT

A separation structure for selecting the propagation mode of the light waves in a light wave guide, the latter being constituted by a strip (100) of a semiconductor material having a first refractive index formed on a semiconductor substrate (10) of a material having a second refractive index lower than the first index and such that the light is confined in the strip forming the guide. The structure is arranged in the path of the light beam in such a manner that it de-limits in the guide on the one hand at least one region ($G_1$), in which the propagation of the light wave is monomode, and on the other hand a region ($G_{11}$), in which the propagation is bimode. According to the invention the said separation structure is formed by an abrupt variation of the dimension of the guide perpendicular to the substrate, the flat surface of the substrate being chosen as reference for the measurement of this dimension in such a manner that, by defining $e_1$ as the dimension of the guide perpendicular to the substrate in the monomode region and $e_2$ as its dimension in the bimode region, these dimensions are associated by the relation $$\frac{\lambda^2}{32n_g(n_g - n_S)} < 2_1^2 < \frac{g\lambda^2}{32n_g(n_h - n_S)} < 2_2^2 < \frac{25\lambda^2}{32n_g(n_g - n_S)}$$

in which $\lambda$ is the transported wavelength, $n_g$ is the refractive index of the light wave guide (100) and $n_S$ is the refractive index of the substrate (10).

12 Claims, 9 Drawing Sheets

FIG.2a
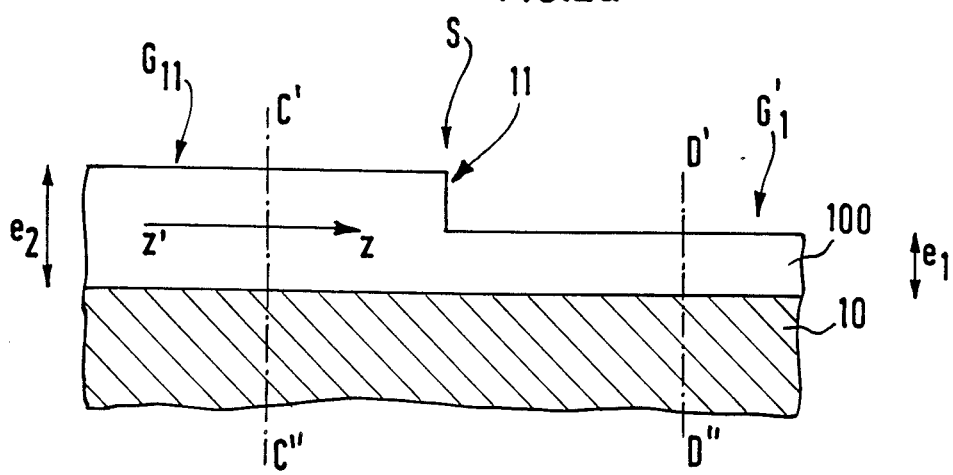
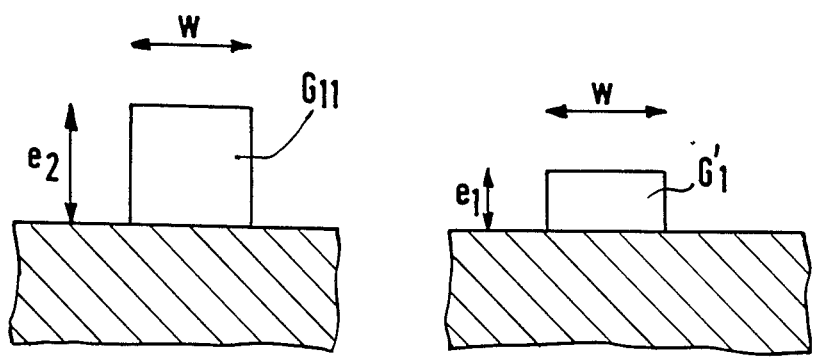
FIG.2b  FIG.2c

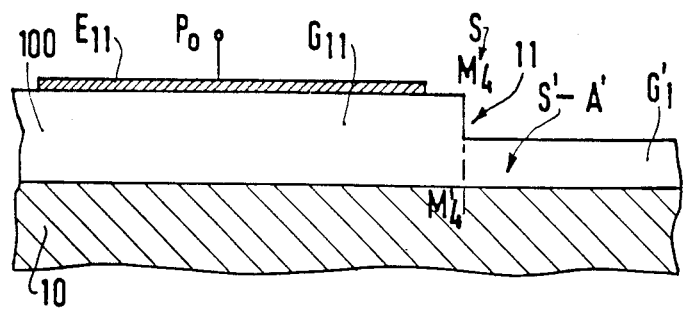
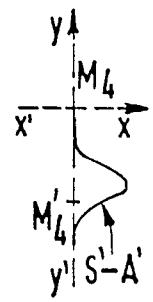
FIG.7a      FIG.7b
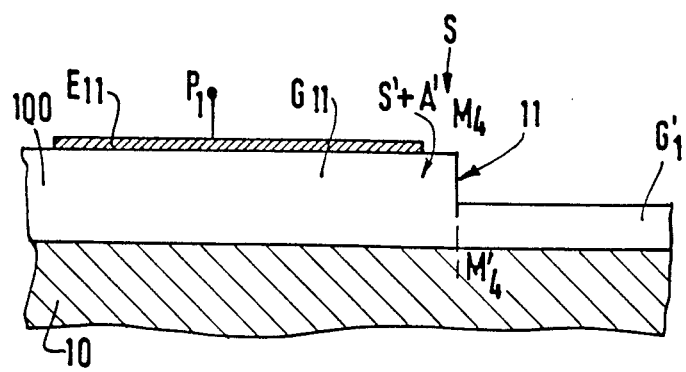
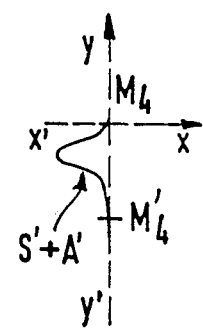
FIG.8a      FIG.8b
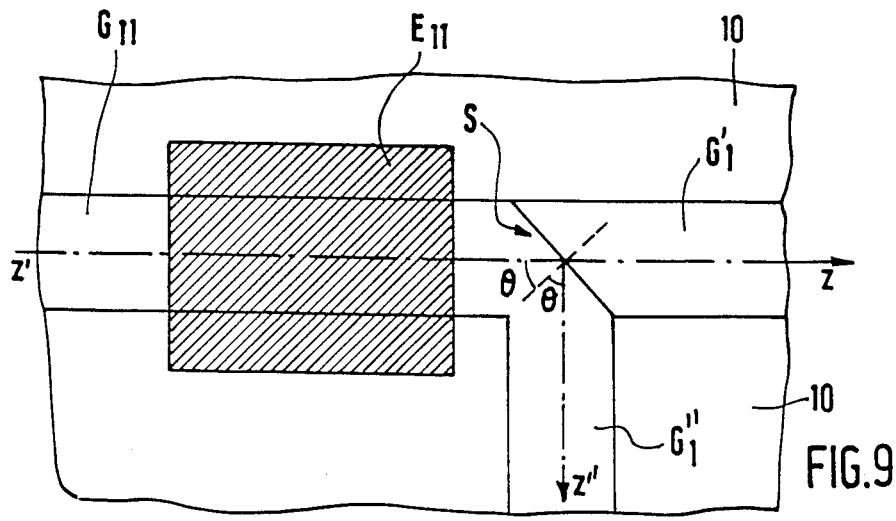
FIG.9

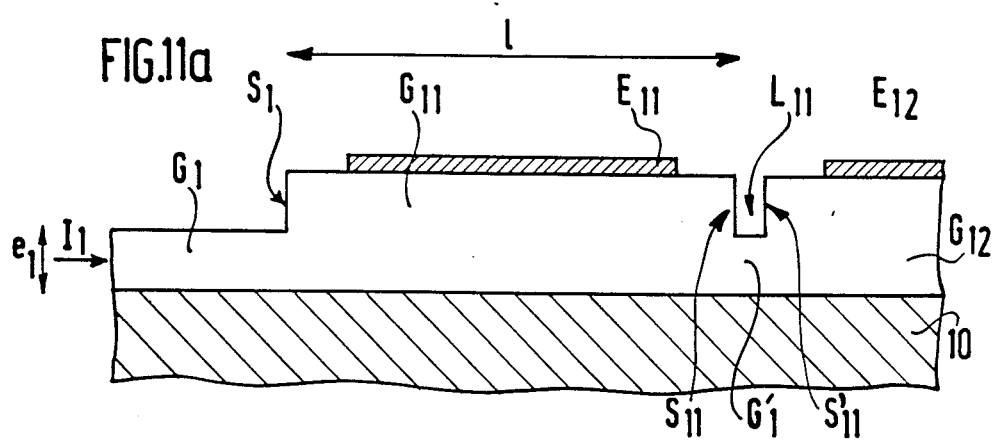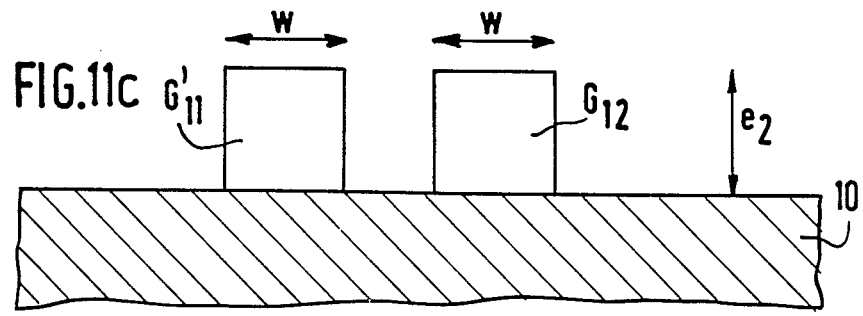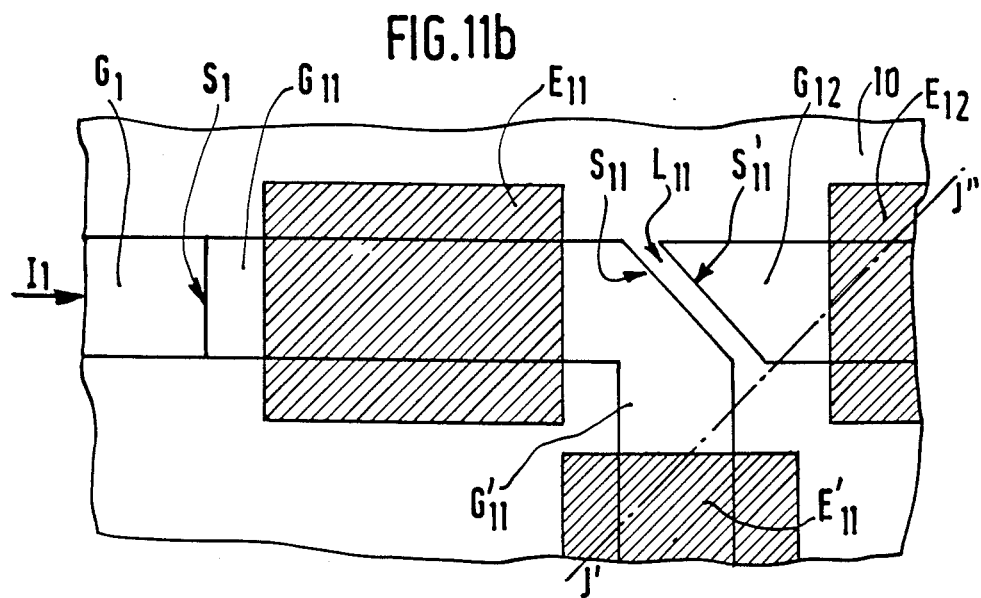

SEPARATION STRUCTURE, OPTICAL SWITCHING ELEMENT INCLUDING SUCH STRUCTURES AND OPTICAL SWITCHING MATRIX CONSTITUTED BY THESE SWITCHING ELEMENTS

BACKGROUND OF THE INVENTION

The invention relates to a separation structure for selecting the propagation mode of the ligh waves in a light wave guide, the latter being constituted by a strip of a semiconductor material having a first refractive index formed on a semiconductor substrate of a material having a second refractive index lower than the first index and such that the light is confined in the strip forming the guide, this structure being arranged in the path of the light beam in such a manner that it de-limits in the guide at least one region in which the propagation of the light wave is monomode and a second region in which the propagation is bimode.

The invention further relates to an optical switching element between two light wave guides including such structures and to an optical switching matrix constituted by these elements.

The invention is used in the field of switching optical signals, transported through optical fibres, for example, in the field of telecommunication, in which the switching between numerous optical fibres has to be made possible in order to avoid having to convert the optical signals transported through fibres into electric signals during switching between the different subscribers.

An optical switching matrix constituted by switching elements comprising such separation structures is known from the publication of A. Neyer and W. Mevenkamp entitled "Single-mode electrooptic X-switch for integrated optical switching networks" in I.E.E.E. Second European Conference on Integrated Optics (Fiorensa, 17-18 Oct. 1983, Conference Publication No. 227, p. 136-139).

This document describes a switching matrix of nxn light wave guides monolithically integrated on a substrate of $LiNbO_3$. Monomode light wave guides are formed in the substrate by diffusion of Ti. These guides have a width w and cross each other pairwise at an angle $\alpha$.

The intersection zone of two guides constitutes the switching element. The variation of the refractive index with respect to the substrate y is two times that of a single guide. This zone has a dimension d parallel to the substrate that is larger than the dimension w on a single guide. Therefore, the intersection zone of two guides is bimode in a plane parallel to the substrate. It transports both the fundamental mode and the transversal mode of the first order.

This device permits switching between the two output guides. The power transported by each of the output guides is determined by the relative phase difference betwen the two fundamental first order modes at the end of the intersection zone. This phase difference depends upon the width w, upon the variation of the refractive index and upon the angle $\alpha$ to the intersection.

This phase difference can be electrically controlled by an electrooptical variation of the refractive index by polarizing two electrodes arranged on either side of the intersection zone of each assembly of two guides.

However, this known device has several disadvantages. In the first place, the intersection angles $\alpha$ of the two guides are small, i.e. from 0.6° to 1.4°. Consequently, they can be formed only with difficulty on a semiconductor material. In fact, all the manufacturing methods that can be used to form the light wave guides and more particularly etching or epitaxial growth are anisotropic. Thus, all the operations not carried out parallel to crystallographic axes or surfaces give rise to roughness or steps in the walls of the guides and hence to losses. Angles of the order of 1° cannot lead to crystallographic directions in the semiconductor material. The known device can therefore be obtained only with difficulty and is characterized by high losses. Furthermore, such angles necessarily lead to a large surface area for the matrix. In fact, for a matrix of 10×10 switching elements, the surface area is of the order of 20×20 mm. For integrated circuits, this surface area is really enormous.

Therefore, the present invention suggests a device which overcomes these disadvantages.

SUMMARY OF THE INVENTION

According to the present invention, this object is achieved by means of a separation structure formed by an abrupt variation of the dimension of the guide perpendicular to the substrate, the flat surface of the latter being chosen as reference for the measurement of this dimension in such a manner that, by defining $e_1$ as the dimension of the guide perpendicular to the substrate in the monomode region and $e_2$ as its dimension in the biomode region, these dimensions are associated by the relation:

$$\frac{\lambda^2}{32n_g(n_g - n_S)} < e_1^2 < \frac{9\lambda^2}{32n_g(n_g - n_S)} <$$

$$e_2^2 < \frac{25\lambda^2}{32n_g(n_g - n_S)}$$

in which $\lambda$ is the transported wavelength, $n_g$ is the refractive index of the light wave guide and $n_S$ is the refractive index of the substrate.

In these conditions, the wave propagating in the zone of a dimension $e_2$ is bimode in a plane perpendicular to the substrate.

According to a first embodiment of the invention, this separation structure is characterized in that the abrupt variation of the dimension of the guide perpendicular to the substrate is an increase of this dimension in such a manner that the first region traversed by the light is monomode and the second region is bimode perpendicular to the substrate.

According to a second embodiment of the invention, this separation structure is characterized in that the abrupt variation of the dimension of the guide perpendicular to the substrate is a decrease of this dimension in such a manner that the first region traversed by the light is bimode perpendicular to the substrate and the second region is monomode, and in that its position in the path of the beams of the first bimode region is such that either a first beam of a first propagation mode is stopped and reflected by the wall formed by said decrease of dimension or a second beam of a second propagation mode continues its path in the zone of decreased dimension forming the second region.

According to a particular modification of this second embodiment, this separation structure is characterized in that it is orientated at an angle different from the line normal to the optical axis of the first region of the light wave guide in such a manner that the first beam of a first propagation mode is reflected by the wall formed by the decrease of dimension at an angle equal to double the value of the angle of incidence.

The advantage obtained by this embodiment is that the optical axis of the guides and the orientation of the separation structure can be chosen according to crystallographic directions of the semiconductor material and hence can readily be obtained by anisotropic etching or growth processes. The other parameters of the formation of the monomode and bimode zones are the dimensions of the guides perpendicular to the substrate. These parameters can be particularly readily controlled if the guides are obtained by means of methods using an etching process or epitaxial growth. In fact, the control of dimensions of layers perpendicular to a substrate is always much easier to realize than the control of the lateral dimensions necessary for the manufacture of the device known from the publication mentioned as prior art.

The combination of these advantages permits of using the invention for the manufacture of a switching element between light wave guides monolithically integrated in the form of semiconductor strips of a material having a first refractive index formed on a semiconductor substrate of a material having a second lower refractive index in such a manner that the light remains confined in the strips forming the guides, this switching element comprising an input region including at least one monomode light wave guide, an intermediate region including a bimode light wave guide and an output region including two light wave guides that can each transport one of the waves originating from the intermediate region, this element also comprising means for selecting the propagation mode of the waves in these different regions, means for separating the beams having a different propagation mode and for orientating them to one or the other of the output guides, as well as means for initiating the switching operation between one or the other of the output guides, characterized in that the means for selecting the propagation mode of the intermediate region are constituted by a separation structure accoring to the first embodiment arranged between the input region and the intermediate region, in that the means for selecting the propagation mode in the output guides, for separating the beams of different modes and for orientating them to one or the other output guide are constituted by a separation structure according to the particular modification of the second embodiment, and in that the means for initiating the switching operation consist in that a polarization is applied to the intermediate region, this polarization causing the index of this region to vary in such a manner that in a first state of the polarization, the first beam of a first propagation mode is reflected by the wall formed by the decrease of dimensions and that in a second state of polarization the second beam of a second propagation mode continues its path in the zone of decreased dimension, a first output guide being arranged in the axis of the reflected beam and a second output guide being arranged in the axis of the transmitted beam.

This switching element has an intermediate zone whose longitudinal dimension along the optical axis is strongly reduced. Moreover, this dimension is not critical because, if a lack of precision will appear with respect to its value, during the manufacture of this device, the phase shift necessary for the desired operation can be imposed by a simple variation of the states of polarization. The switching element according to the invention consequently has a small dimension and has a simple construction.

According to a particular embodiment, the switching element according to the invention is characterized in that the substrate consists of gallium arsenide of the n+ type and in that the light wave guides consist of gallium arsenide of the n− type.

In these conditions, this switching element is very accurately adapted to the applications in the field of telecommunication, for which the wavelength used is 1.3 $\mu$m or 1.55 $\mu$m.

In these conditions, the light is very well confined in the guides by the crystallographic facets and the losses are reduced. Moreover, the reflection coefficient associated with the first beam of a first propagation mode reflected by a separation structure constituted by a crystallographic facet is a maximum if the external environment of this facet is air or another medium having a low refractive index. The losses during the separation of the beams are therefore also reduced.

Thus, an optical switching matrix between a number nxn of light wave guides characterized in that it is formed by nxn switching elements according to the invention can also be obtained.

This matrix has the advantage that it has a small surface area and a simple construction. Moreover, it ensures a broadband switching that could not be obtained by means of a purely electrical switching.

Finally, a great advantage resides in the fact that any error with respect to the distances between the switching elements in the matrix can be eliminated by providing a polarization applied to each of the branches permitting of eliminating in a simple manner and without enlarging the surface area any phase shift error.

BRIEF DESCRIPTION OF THE DRAWINGS

The invention will be understood more clearly by means of the following description illustrated by the accompanying Figures, of which:

FIGS. 2a to 2c show in longitudinal sectional view and in cross-section the separation structure according to the invention in a second embodiment;

FIGS. 7a and 7b show the propagation of the intensity for a position of the separation structure as shown in FIG. 2 associated with a polarization of the bimode region;

FIGS. 8a and 8b show the propagation of the intensity for the same position of this separation structure associated with another polarization of the bimode region;

FIG. 9 shows in plan view the same separation structure;

FIGS. 11a to 11c show in longitudinal sectional view, in plan view and in cross-section, respectively, a region of the switching matrix according to the invention;

DETAILED DESCRIPTION OF THE INVENTION

Figure 1A:
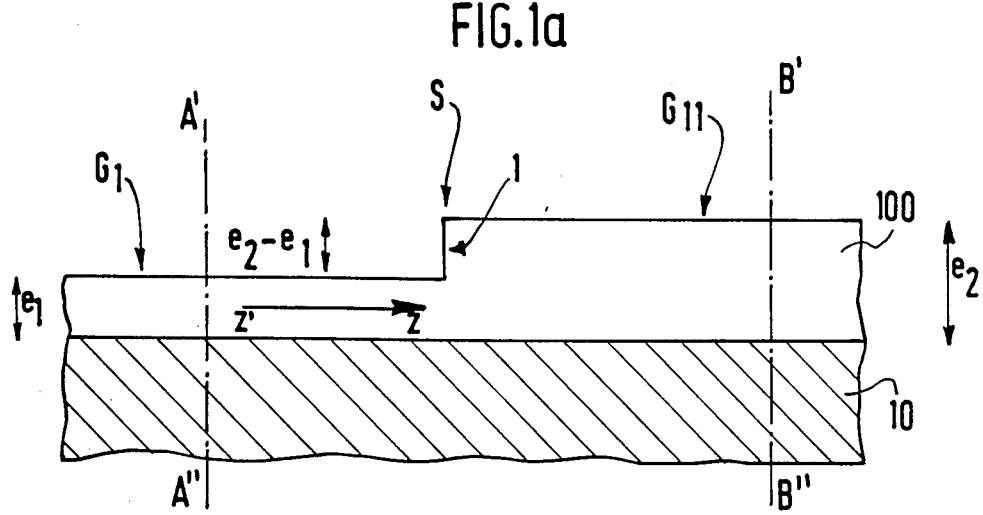
FIGS. 1a to 1c show in longitudinal sectional view and in cross-section the separation structure according to the invention in a first embodiment.
Figure 1B:
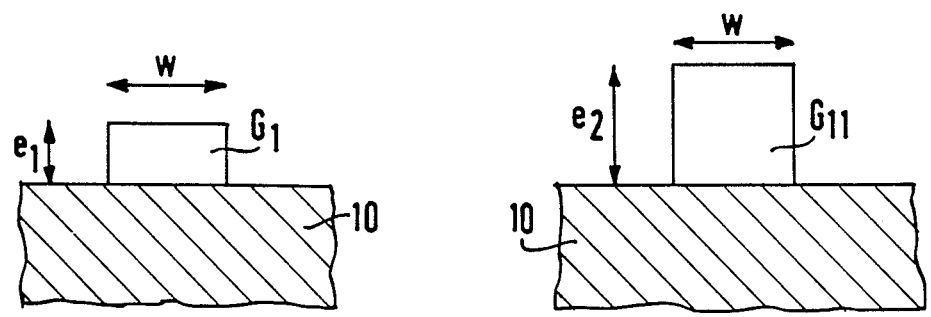
Figure 1C:
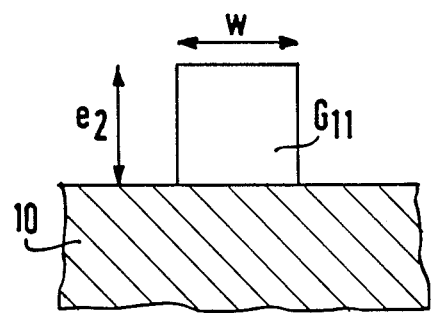

As shown in longitudinal sectional view in FIG. 1a, the separation structure S according to the invention is applied to a light wave guide 100. This guide is formed by a semiconductor strip formed on the surface of a flat substrate 10 of a compatible semiconductor material. The refractive index $n_g$ of the light wave guide is slightly higher than the index of the substrate $n_S$ in such a manner that the light propagating in the direction of the optical axis z'z is confined in the guide. The light wave guide 100 can have a straight rectangular cross-section, as shown in FIGS. 1b and 1c. The guide 100 has a light input region $G_1$, whose dimension parallel to the substrate is W and whose dimension perpendicular to the substrate is $e_1$. The region $G_1$ is provided for transporting a monomode wave having a wavelength λ. For the fundamental mode, the dimension $e_1$ of the guide perpendicular to the substrate is subjected to the condition (1):

$$\frac{(2m+1)^2\lambda^2}{32n_g(n_g-n_S)} < e_1^2 < \frac{(2m+1)^2\lambda^2}{32n_g(n_g-n_S)} \quad (1)$$

in which m and m' are mode constants such that
m=0 corresponding to the fundamental mode and
m'=1 corresponding to the first order mode.

This relation is known from the document published by R. G. Hunsperger, Springer Series in Optical Sciences, entitled "Integrated Optics: Theory and Technology". Springer-Verlag, Berlin, Heidelberg, New York (p. 35–37, §3.1.2, 3.1.3).

The separation structure according to the invention denoted by S in FIG. 1 separates the monomode region $G_1$ from a second region $G_{11}$ intended to transport a bimode wave at right angles to the substrate. The dimension $e_2$ of the guide $G_{11}$ perpendicular to the substrate has then to fulfil the condition (2):

$$\frac{(2m'+1)^2\lambda^2}{32n_g(n_g-n_S)} < e_2^2 < \frac{(2m''+1)^2\lambda^2}{32n_g(n_g-n_S)} \quad (2)$$

in which m'=1 corresponding to the first order mode, and m''=2 corresponding to the second order mode.

The conditions (1) and (2) express the fact that in each region of the guide the dimensions perpendicular to the substrate have to be sufficient to ensure the propagation of the chosen mode, but limited in order to avoid the propagation of the higher order mode. FIGS. 1b and 1c show respective cross-sections of the guide 100 in the regions $G_1$ and $G_{11}$ along planes A'A'' and B'B''.

It should be noted that in the bimode region $G_{11}$ both the fundamental mode wave and the first order wave propagate. Moreover, the dimension w of the region $G_1$ is the same as the dimension w of the region $G_{11}$ parallel to the substrate. This dimension w is chosen so that the regions $G_1$ and $G_{11}$ are both monomode parallel to the substrate.

According to the invention, the separation structure S permitting of passing from the monomode region $G_1$ of the light wave guide to the bimode region $G_{11}$, is an abrupt variation of the dimension of the guide perpendicular to the substrate. In the embodiment of the invention shown in FIG. 1, this abrupt variation is an increase of the dimension of the guide perpendicular to the substrate in such a manner that the said dimension passes from the value $e_1$ to the value $e_2$ such that $$e_1 < e_2$$

along a flat wall 1 perpendicular to the substrate and to the optical axis z'z of the light wave guide.

As shown in FIG. 2a, the separation structure S is in this case applied to a bimode region $G_{11}$ perpendicular to the substrat 10 of a light wave guide 100 of the same type as described above, which transports a light beam having a wavelength λ in the direction z'z of the optical axis of the guide.

The dimension of this region $G_{11}$ of the guide is subjected, as already stated above, to the relation (2). The light wave guide 100 shown in FIG. 2a in longitudinal sectional view has a second region $G'_1$ intended to transport a monomode wave of the same wavelength. The dimension $e_1$ of the region $G'_1$ has then to satisfy the relation (1) mentioned above. FIGS. 2b and 2c show respective cross-sections of the guide 100 in the regions $G_{11}$ and $G'_1$ along the planes C'C'' and D'D''.

Figure 3A:
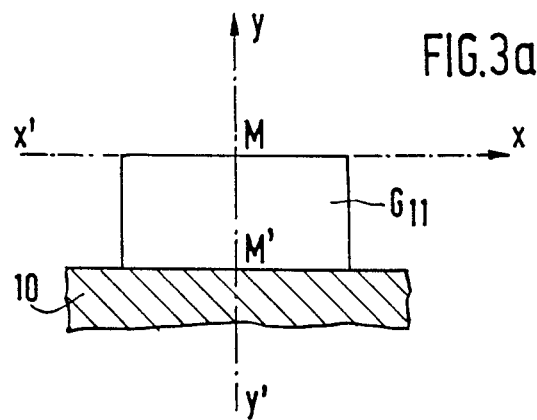
FIGS. 3a to 3d show the propagation of the amplitude of the waves in the bimode region of the switching element.
Figure 3B:
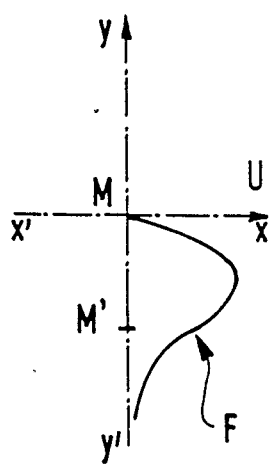
Figure 3C:
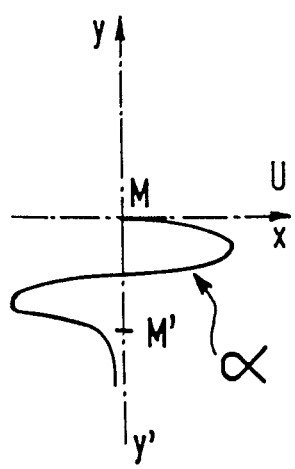
Figure 3D:
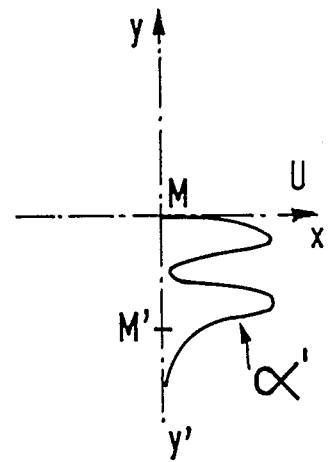

The bimode region $G_{11}$ perpendicular to the substrate transports on the one hand the fundamental mode, whose amplitude U is indicated by the curve F in the plane (x'x, y'y) of the straight cross-section of the guide in this region, FIG. 3a showing the relative position of the axes x'x, and y'y in this section and FIG. 3b showing the curve of the amplitude U. The region $G_{11}$ transports on the other hand the first order mode. This first order mode can be decomposed into a symmetrical first order mode and an asymmetrical first order mode. The amplitude U of the asymmetrical mode is indicated by the curve α in FIG. 3c and the amplitude U of the symmetrical mode is indicated by the curve α' in FIG. 3d.

In the bimode region $G_{11}$ then appears a beat phenomenon between the sum S'+A' of the energies S' and A' (which are the square values of the amplitudes α' and α, respectively), and between the difference S'−A'. The centre of gravity of these energies is indicated in FIG. 4a by the curve β in broken lines.

Figure 4A:
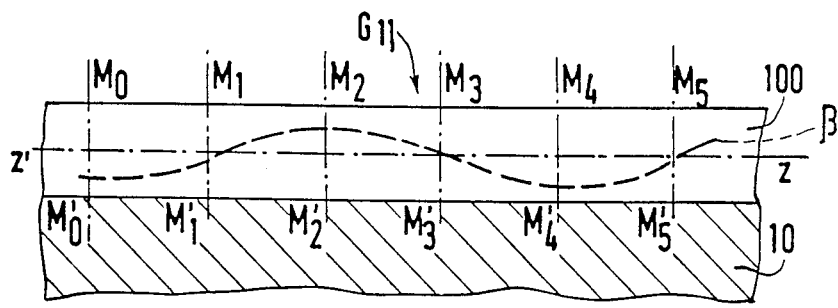
FIGS. 4a and 4b show the propagation of the intensity of the waves in the bimode region of the switching element.
Figure 4B:
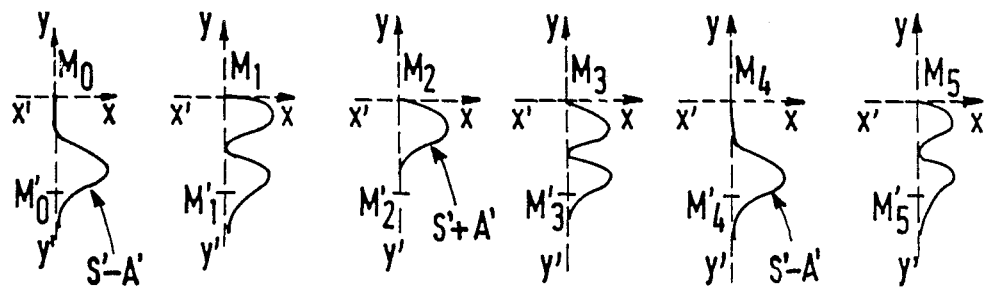

FIG. 4b show the curves representative of the energies in the planes of the straight cross-section of the region $G_{11}$ in the positions $M_0M'_0$, $M_1M'_1$, $M_2M'_2$, $M_3M'_3$, $M_4M'_4$ and $M_5M'_5$, respectively, of the longitudinal sectional view of FIG. 4a.

It should be noted that in the positions $M_0M'_0$ and $M_4M'_4$ the energy is S'−A', while in the position $M_2M'_2$ the energy is S'+A'.

According to the invention, the separation structure S permitting of passing from the bimode region $G_{11}$ to the monomode region $G_1'$ as shown in FIG. 2a in longitudinal sectional view is an abrupt variation of the dimension of the guide perpendicular to the substrate. In the embodiment shown in FIG. 2, this abrupt variation is a decrease of the dimension of the guide perpendicular to the substrate in such a manner that this dimension passes from the value $e_2$ to the value $e_1$ such that $e_1 < e_2$ along a flat wall 1.

Figure 5A:
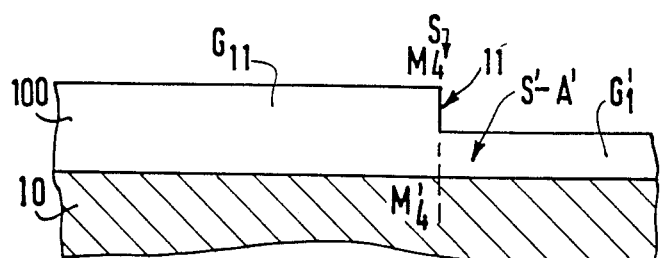
FIGS. 5a and 5b show the propagation of the intensity for a position of the separation structure as shown in FIG. 2.
Figure 5B:
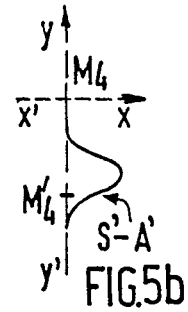

FIG. 5a shows in longitudinal sectional view that, for example, for the positions $M_0M'_0$ or $M_4M'_4$ of the structure S along the axis z'z the energy wave S'A' continues its path in the region $G_1'$ of decreased dimension of the light wave guide, FIG. 5b showing the form of the wave in a plane of the straight cross-section of the guide in this region $G'_1$.

Figure 6A:
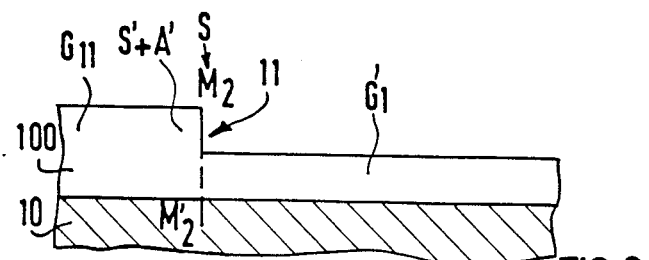
FIGS. 6a and 6b show the propagation of the intensity for another position of the separation structure as shown in FIG. 2.
Figure 6B:
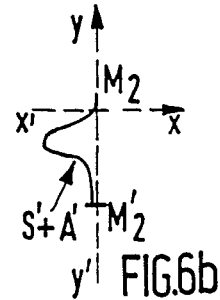

It is clear that it is possible to find another position, for example $M_2M'_2$, of the structure S along the axis z'z in order that the wave of energy S'+A' is reflected by the wall 11. FIG. 6a shows in longitudinal sectional view a structure S thus arranged and FIG. 6b shows the form of the reflected wave in a plane of the straight cross-section of the guide in the region $G_{11}$.

For a position of the structure S chosen in accordance with that of FIG. 5a such, that, for example, the wave S'−A' is transmitted, there can be obtained that the wave S'+A' is reflected on command for the same position of the structure S by applying to the region $G_{11}$ a polarization apt to cause the index $n_g$ of the guide to vary by a value $\Delta n_g$, then producing a variation of the phase difference between S'−A' and S'+A' in such a manner that for the same position of S the wave S'+A+ will be reflected on the wall 11. This phenomenon is illustrated in FIGS. 7a and 8a. This polarization may be prodced, for example, by means of a potential difference applied between an electrode $E_{11}$ arranged at the surface of the region $G_{11}$ and an electrode not shown, whose contact is provided on the substrate, as shown in FIGS. 7a, 8a and 9 illustrating the guide in longitudinal sectional view in a first state of polarization $P_0$, the guide in longitudinal sectional view in a second state of polarization $P_1$ and the guide in plan view provided with an electrode $E_{11}$, respectively. FIGS. 7b and 8b show the curve of the energy transmitted in the region $G'_1$ corresponding to FIG. 7a and the curve of the energy reflected in the region $G_{11}$ corresponding to FIG. 8a, respectively, these curves being represented in a plane of the cross-section of these regions.

The alternation of one state of polarization $P_0$ and of another state of polarization $P_1$ applied by means of a potential difference between an electrode such as $E_{11}$ on the region $G_{11}$ and an electrode not shown, whose contact is provided on the substrate, permits the corresponding alternation between the transmission of the wave S'−A' in the region $G'_1$ and the reflection of the wave S'+A' by the wall 11 (FIGS. 7 and 8).

In order that the reflected wave S'+A' is available, the wall 11 can be arranged in such a manner that the incident beam encloses with this wall an angle $\theta$. The wave S'+A' is then reflected by the wall 11 at a double angle ($2\theta$) and can be transported by a light wave guide $G''_1$ arranged in the path of the beam reflected in this direction of propagation, as shown in plan view in FIG. 9.

It should be noted that in these conditions, beyond the separation structure S the waves S'−A' and S'+A' are transported by light beams, whose distance from the substrate is different.

It should moreover be noted that the position of the structure S along the axis z'z of the region $G_{11}$ is not critical to obtain the operation described above. It is in fact sufficient to apply the polarizations $P_0$ and $P_1$ suitable to obtain in one case the transmission of the wave S'−A' and in the other case the reflection of the wave S'+A', respectively.

It now clearly appears that the separation structure according to the invention permits of obtaining an optical switching element.

Figure 10A:
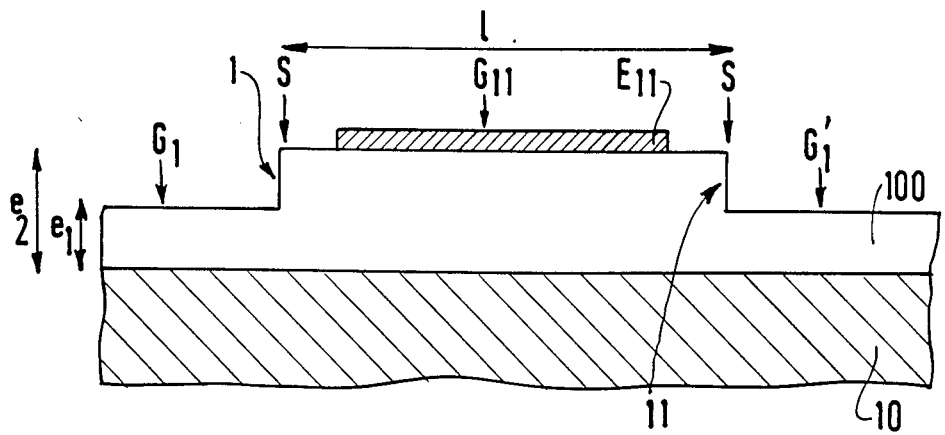
FIGS. 10a to 10c show in longitudinal sectional view, in plan view and in cross-section, respectively, a switching element according to the invention.

As shown in FIG. 10a in longitudinal sectional view, this switching element is constituted by a light wave guide 100 of the type already described formed on a substrate 10.

This element comprises a monomode input region $G_1$, an intermediate region $G_{11}$ bimode perpendicular to the substrate and monomode parallel to the substrate, and an output region including two light wave guides $G'_1$ and $G''_1$. This element moreover comprises a separation structure S according to the first embodiment of the invention described formed by a wall 1 perpendicular both to the substrate and to the optical axis z'z and another separation structure S according to the second embodiment of the invention formed by the wall 11 perpendicular to the substrate, but arranged at an angle $\theta$ to the optical axis. A polarization is additionally applied to the intermediate region $G_{11}$, for example by means of an electrode $E_{11}$ associated with an electrode not shown, whose contact is provided on the substrate.

The operation of this switching element ensues from the properties of the separation structure formed by the wall 1 and of the separation structure formed by the wall 11.

The input region $G_1$ of the guide 100 is monomode both parallel to the substrate and perpendicular to the substrate. The dimension $e_1$ of this region perpendicular to the substrate is given by the relation (1) mentioned above. The dimension w of this region parallel to the substrate is also provided for verifying this relation.

The wall 1 forms an abrupt increase of the dimension of the guide perpendicular to the substrate and the dimension of the guide in the intermediate region $G_{11}$ is $e_2$, which verifies the relation (2). In these conditions, the propagation of the waves in the intermediate region $G_{11}$ is bimode and is in accordance with what has been described above for such a region having a dimension w parallel to the substrate.

A second separation structure forming an abrupt restriction of the dimension of the guide perpendicular to the substrate by means of the wall 11 is arranged at a distance l from the first separation structure formed by the wall 1. This distance l is provided as a function of the wavelength $\lambda$, of the dimension $e_2$ and of the indices $n_g$ of the guide and $n_S$ of the substrate in order that the energy wave S'−A' is transmitted in the guide region $G'_1$ of decreased dimension.

By the application of a polarization to the region $G_{11}$, for example by means of the electrode $E_{11}$, associated with the electrode not shown whose contact is provided on the substrate, a variation of the index of the guide $G_{11}$ is produced leading to a phase difference between the energy waves S' and A', such that the energy wave S'+A' is reflected on the wall 11. The latter is arranged at an angle $\theta$ to the optical axis z'z so that the beam thus reflected propagates in the guide $G''_1$ which encloses the angle $2\theta$ with z'z.

Figure 10C:
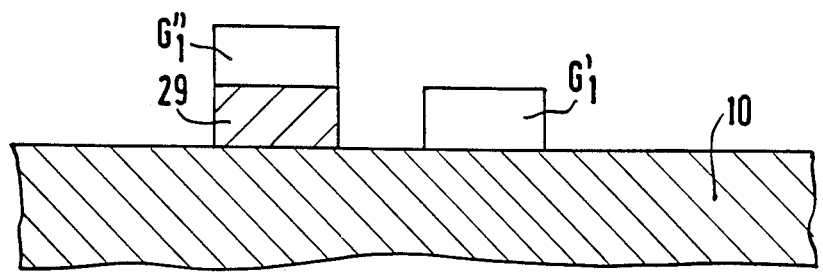
Figure 10B:
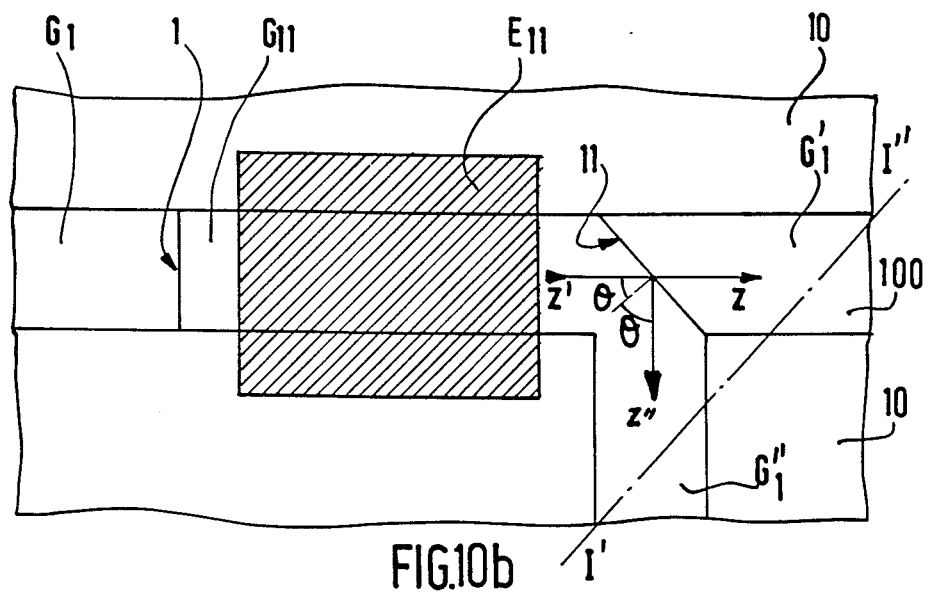

The beams propagating in $G'_1$ on the one hand and in $G''_1$ on the other hand are monomode and the dimensions of these guide regions satisfy the relation (1). Moreover, the guide region $G''_1$ is not situated at the same level with respect to the substrate as the region $G'_1$, as shown in FIG. 10c, which is a cross-sectional view taken on the axis I'I'' of FIG. 10b, the latter figure being a plan view of the switching element. Thus, as shown in FIG. 10c, a semiconductor region 29 having an index lower than the index of the guide $G''_1$ can be obtained between the latter and the substrate. This index difference is provided in order to obtain the confinement of the light in the guide $G''_1$.

The guides $G'_1$ and $G''_1$ arranged in line with the transmitted beam and in line with the beam reflected by the separation structure formed by the wall 11, respectively, constitute the two output guides of the switching element between which the switching operation is initiated by the polarization of the intermediate region.

The length l of the intermediate region is not critical. In fact, a first polarization $P_0$ can be applied to this region $G_{11}$ in order to obtain exactly the transmission of the wave $S'-A'$ in the guide $G'_1$. Subsequently, a second polarization $P_1$ can be applied to the region $G_{11}$ in order to obtain exactly the reflection of the wave $S'+A'$ in the guide $G''_1$.

Figure 12:
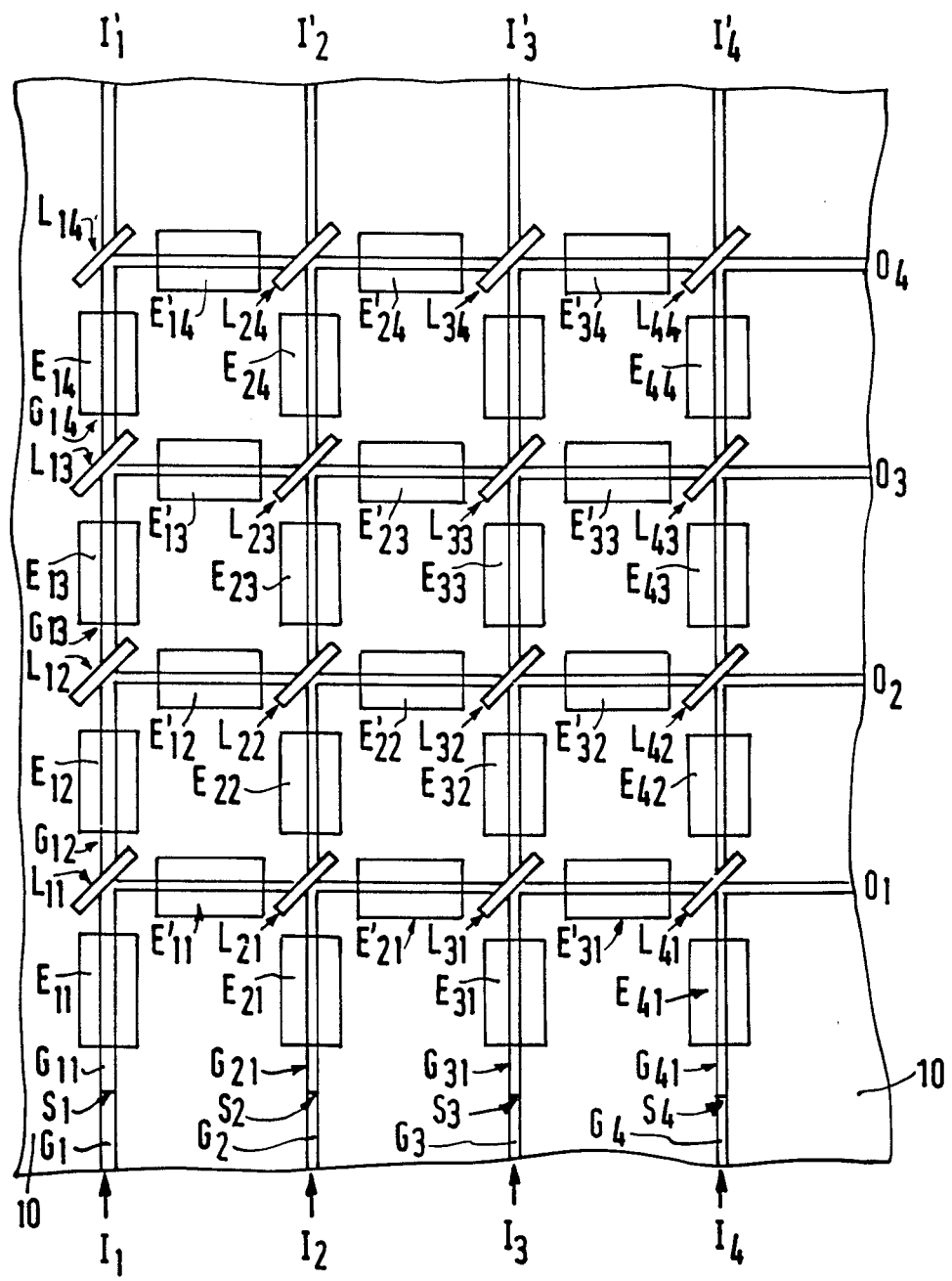
FIG. 12 shows diagrammatically in plan view such a switching matrix having 4×4 switching elements.

An embodiment of an optical switching matrix having four inputs $I_1,I_2,I_3,I_4$ and four outputs $O_1,O_2,O_3,O_4$ is shown in FIG. 12.

Optical signals having a wavelength $\lambda$, which are monomode perpendicular to the substrate 10, are applied to each of the inputs $I_1,I_2,I_3,I_4$ formed by guides of the type $G_1$ described above and $G_1,G_2,G_3,G_4$ respectively, having a dimension $e_1$ perpendicular to the substrate. The signals become bimode beyond the separation structures $S_1,S_2,S_3$ and $S_4$, respectively, formed by walls of the type of the wall 1 described above and are transported by the intermediate regions $G_{11},G_{21},G_{31}$ and $G_{41}$, respectively.

FIG. 11a shows in longitudinal sectional view a region controlled by the input $I_1$ and FIG. 12b shows the same region in plan view.

As shown in this Figure, the beam transported by the region $G_{11}$ meets the separation structure $S_{11}$ of the type of the wall 11 described and in accordance with the polarity applied to this intermediate region $G_{11}$ either a beam of a first propagation mode is reflected in the guide $G'_{11}$ or a second beam of a second propagation mode is transmitted in the region $G'_1$ of decreased dimension.

In order that again other switching operations can be effected by means of the beams originating from this switching elements, bimode regions are again arranged in the path of these beams.

For this purpose, a new separation structure $S'_{11}$ of the type of the wall 1 described is provided on the guide $G'_1$ in such a manner that a region of the intermediate type $G_{12}$ is formed.

Thus, the device formed by the wall $S_{11}$ of the type 1 and by the wall $S'_{11}$ of the type 11 constitutes a plate having parallel surfaces $L_{11}$ of a depth $e_2-e_1$, $e_2$ being the dimension of the regions $G_{11}$ and $G_{12}$ perpendicular to the substrate and $e_1$ being that of the region $G'_1$. This plate $L_{11}$ can be either an air plate or a plate of material having an index lower than that of the guides in order to ensure the total reflection.

The bimode propagation in the guide $G'_{11}$ transporting the reflected beam is ensured by choosing the dimension of this guide perpendicular to the substrate equal to that of the intermediate region $G_{11}$, as shown in FIG. 11c, which is a cross-sectional view of the region shown in FIG. 11b, the sectional view being taken on the axis $J'J''$.

In order to ensure a regular form for the switching matrix, the angle at which the plate $L_{11}$ is inclined, may advantageously be 45° so that the guide $G'_{11}$ is perpendicular to the input guide.

A single element of a switching matrix will therefore be constituted by an intermediate bimode region identical to $G_{11}$ and by a plate having parallel surfaces identical to $L_{11}$ that can supply either a transmitted beam or a beam reflected by means of the polarization applied to this intermediate region.

When this single matrix element is 15 times repeated, the switching matrix shown in FIG. 12 is obtained.

It should be noted that the branches perpendicular to the input branches of the type of the guide branch $G'_{11}$ are also provided with polarization electrodes, such as, for example, $E'_{11}$, $E'_{21}$ etc. These electrodes are intended to permit any elimination phase shift in order that the beam transported by these branches can be directed to the output corresponding to its direction $O_1,O_2,O_3$ or $O_4$. These phase shift elimination electrodes are not absolutely necessary if the distance between two platees having parallel surfaces in these branches is obtained with a sufficient amount of accuracy in order that the wave $S'-A'$ can be directly transmitted. If the device is not obtained with a sufficient amount of accuracy, the electrodes $E'_{11}$, $E'_{21}$, $E'_{31}$ etc. are effective to atain this result. It should also be noted that a single electrode, whose contact is provided on the substrate, is sufficient in order that the reference potential is applied thereto permitting a potential difference with the other electrodes.

Thus, each of the four inputs $I_1,I_2,I_3,I_4$ can be directed to $O_1$, to $O_2$, to $O_3$ or to $O_4$. An input not directed to an output may be transmitted to one of the transmitted beam outputs $I'_1, I'_2, I'_3, I'_4$ in order not to be lost. All the switching operations are consequently possible.

EMBODIMENT

The assembly of the devices described above is preferably obtained from light wave guides buried in the substrate. In fact, these devices include guide portions which are bimode perpendicular to the substrate and monomode parallel to the substrate. This effect can be more readily obtained if a material of the same kind as the substrate will cover the lateral surfaces of the light wave guides.

On the other hand, as shown during consideration of the prior art, all the manufacturing methods applied to the semiconductor devices are more or less anisotropic. It is therefore advantageous to use this property to ensure that the surfaces of the light wave guides and the walls of the separation structures are crystallographic facets. The light will then be better confined in the guides or better reflected by the plates having parallel surfaces included in the matrix. Advantageously, the switching matrix is formed on a semiconductor monocrystalline substrate and the light wave guides as well as the separation structures are obtained by anisotropic etching or anisotropic epitaxial growth along crystallographic preferential axes in order to cause these facets to appear.

Finally, it is advantageous to choose gallium arsenide (GaAs) as semiconductor material constituting the substrate because this material permits the propagation of the waves having wavelengths of 1.3 μm and 1.55 μm envisaged for the applications in the field of telecommunication.

The different FIG. 13 illustrate an embodiment which satisfies the conditions defined above.

Figure 13A:
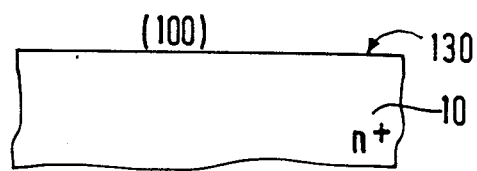
FIG. 13 show the different stages of a method of manufacturing a switching element in cross-section.
Figure 13B:
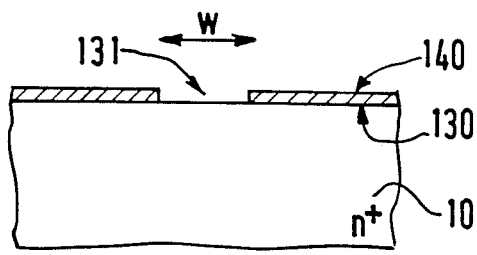
Figure 13C:
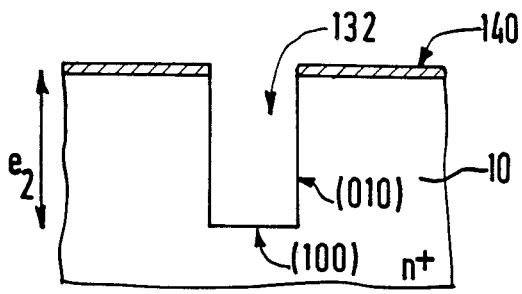
Figure 13D:
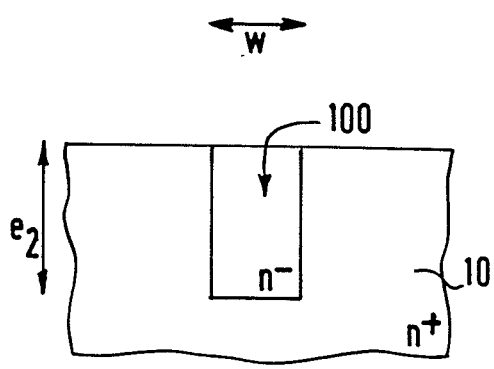
Figure 13E:
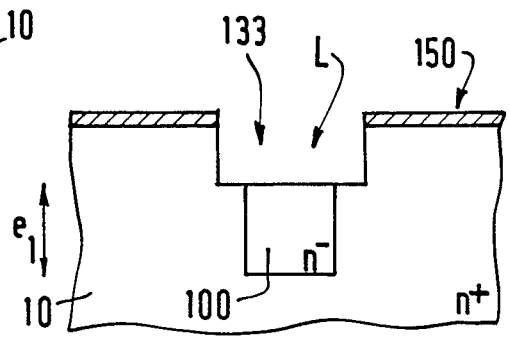

The method which permits of obtaining this embodiment comprises the following steps:

(a) forming a monocrystalline substrate of gallium arsenide 10 of the n+ type doped, for example, at $6.10^{17}$ carriers per cm$^3$ and having a flat surface 130 orientated along the crystallographic plane (100) (FIG. 13a);

(b) delimiting by a mask 140 slots 131 having a width W along the crystallographic axes [110] and [110] perpendicular to the areas provided for the light wave guides forming the switching matrix. This mask can consist of silica (SiO$_2$) and the width W of the slots can be about 4 μm. The surface (100) of the substrate is consequently exposed in these slots (FIG. 13b);

(c) etching the substrate in the grooves, for example, by a so-called RIE (Reactive Ion Etching) method. This method has in comparison with the other methods the advantage of forming etching edges accurately perpendicular to the substrate and freed from underetching of the mask. Thus, in the slots 131 grooves 132 are obtained formed in the substrate (FIG. 13c). The depth of the grooves is chosen to be equal to the thickness $e_2$;

(d) introducing the sample thus prepared into a vapour phase epitaxy reactor and lightly etching "in situ" in order to make appear more clearly the crystalline surfaces developed in the grooves by RIE. It should in fact be noted that according to the thermodynamic conditions the epitaxy reactor can permit an etching process or an epitaxial growth process. The longitudinal surfaces of the grooves are (110) and (110) surfaces;

(e) growing from the vapour phase by epitaxy in the grooves tapes of gallium arsenide of the n− type doped, for example, at a level lower than $10^{15}$ carriers per cm$^3$ until the groove is filled in such a manner that a "PLANAR" structure is obtained (FIG. 13d). Eliminating the mask;

(f) delimiting by means of a second mask 150 openings 133 corresponding to the localization of the plates having parallel surfaces L. These plates having parallel surfaces L will be orientated at 45° to the light wave guides parallel to the crystallographic planes (010) or (001). This mask may also be obtained by means of silica (SiO$_2$);

(g) etching in the openings of this second mask by, for example, the RIE method grooves forming the plates having parallel surfaces L and separation structures S of the type 1 (FIG. 13e).

By way of example, branches for the dimensions of the light wave guides perpendicular to the substrate are also given here.

With a refractive index $n_g \cong 3.5$ corresponding to a substrate doped at $6.10^{17}$ carriers per cm$^3$, a difference between the indices $n_g - n_S \cong 10^{-3}$ and for a wavelength $\lambda = 1.3$ μm:

3.88 μm < $e_1$ < 11.65 μm 11.65 μm < $e_2$ < 19.52 μm

The thickness of the plates having parallel surfaces L (or the distance separating the two separation structures forming these plates) can be of the order of 1 μm.

The distance 1 between two plates having parallel surfaces (or length of the intermediate regions) can be of the order of 200 μm equivalent to the oscillation period on the curve of the centres of gravity of the energies.

The etching suitable for forming the plates having parallel surfaces is effected evidently over a depth equal to the value $e_2 - e_1$ chosen.

The electrodes $E_{11}$, $E_{21}$, $E_{31}$ etc. may be, for example, Schottsky barriers obtained by evaporation of nickel-platinum-gold (Ni-Pt-Au) over a length slightly smaller than that of the intermediate region and over a width exceeding to the smallest possible extent the dimension w of the guides in order to minimize the capacitance. However, an "ear" is provided for forming the electrical contact.

The electrode permitting of providing the contact on the substrate and not shown in the Figures for the sake of simplicity can be obtained either on the back surface of the substrate or on the same surface as the device by an ohmic contact formed, for example, from a gold-germanium (Au-Ge) alloy.

A potential difference between the ohmic contact of the substrate (which may receive, for example, the reference potential) and an electrode of the Schottky barrier type, such as $E_{11}$, $E_{21}$ etc., permits of producing a considerable electric field at the level of the intermediate region of the switching elements. This field due to linear electrooptic effect permits of modifying the refractive index of this region and of inducing an index difference:

$$\Delta n_g = n^3{}_g \times r_{41} \times E,$$

in which $r_{41}$ is an element of an electrooptical matrix which becomes operative when the direction of the light is [100] or [110], and in which E is the electric field.

Other embodiments of the devices according to the invention are possible without departing from the scope of the invention as defined by the appended claims.

What is claimed is:

1. A separation structure for selecting the propagation mode of light waves in a light guide comprising:
   a semiconductor substrate characterized by an index of refraction $n_s$;
   a strip of semiconductor material on said substrate characterized by an index of refracting $n_g$ for propatating light waves within said strip along an optical axis;
   a mono-mode light guiding region in said strip characterized by a first dimension $e_1$ perpendicular to said substrate;
   a bi-mode light guiding region in said strip adjacent to said first region and characterized by a second dimension $e_2$ perpendicular to said substrate;
   wherein the change in dimension from $e_1$ to $e_2$ is abrupt.

2. The separation structure of claim 1 wherein:

$$\frac{\lambda^2}{32n_g(n_g - n_S)} < e_1^2 < \frac{9\lambda^2}{32n_g(n_g - n_S)} < e_2^2 < \frac{25\lambda^2}{32n_g(n_g - n_S)}$$

in which λ is the wavelength of the guided light waves.

3. The separation structure of claim 1 wherein the strip of semiconductor material is oriented so the first region traversed by the light wave is the mono-mode region and the next region travered by the light wave is the bi-mode region.

4. The separation structure of claim 1 wherein the strip of semiconductor material is oriented so the first region traversed by the light wave is the bi-mode region, the second region traversed by the light wave is the mono-mode region and the abrupt change of dimension comprises a surface at the end of the bi-mode region, said surface located in the path of light waves carried by said bi-mode region such that light beams of a first propagation mode are reflected by said surface and light waves of a second propagation mode are propagated into said mono-mode region.

5. The separation structure of claim 4 wherein said surface is oriented at an angle different from a line normal to the optical axis of the bi-mode region such that light beams of said first propagation mode are reflected by said surface at an angle equal to twice the angle of incidence.

6. The separation structure of any of claims 1-5 comprising means coupled to said bi-mode light guiding region for selectively changing $n_2$.

7. The separation structure of claim 6 wherein said means coupled to said bi-mode light guiding region comprises means for establishing a potential difference across said region.

8. A light wave switching element comprising:
a semiconductor substrate characterized by an index of refraction $n_S$;
a strip of semiconductor material on said substrate characterized by an index of refraction $n_g$ for propagating light waves within said strip along an optical axis;
an input guide comprising a mono-mode light guiding region in said strip characterized by a first dimension $e_1$ perpendicular to said substrate;
a first output guide comprising a second mono-mode light guiding region in said strip characterized by said first dimension $e_1$ perpendicular to said substrate;
wherein the changes in dimension from $e_1$ to $e_2$ and from $e_2$ to $e_1$ are abrupt and the changes of dimension from $e_1$ to $e_2$ and from $e_2$ to $e_1$ comprise first and second surfaces respectively at the ends of the bi-mode region, said second surface located in the path of light waves carried by said bi-mode region and oriented at an angle different from a line normal to the optical axis of the bimode region such that light beams of a first propagation mode are reflected by said surface at an angle equal to twice the angle of incidence and light waves of a second propagation mode are propagated into said first output guide;
a second output guide comprising a mono-mode light guiding strip having one end adjacent to said surface and oriented to carry light waves of said first propagation mode that are reflected by said surface; and
means for changing the index of refraction $n_g$ of said intermediate region for switching an input light wave between said first and second output guide.

9. The switching element of claim 8 wherein said substrate comprises $n^+$ type gallium arsenide and the strip of semiconductor material comprises $n^-$ type gallium arsenide.

10. The switching element of claim 8 wherein said first surface is formed by a crystallographic facet at right angles to the optical axis of the input and the second surface is formed by a crystallographic facet oriented at an angle of 45° to the optical axis of the intermediate region in such a manner that the first output guide is aligned with the axis of the intermediate region and the second output guide is aligned at right angles to the first guide.

11. The switching element of claim 10 wherein said intermediate region transports a fundamental mode, a first order mode comprising a symmetrical mode having an intensity $S'$ and an asymmetrical mode having an intensity $A'$ and symmetrical and asymmetrical modes propagate simultaneously with a different effective index producing a beat phenomenon between $S'-A'$ and $S'+A'$; and
wherein said first and second surfaces are separated by a distance such that the second surface reflects the $S'+A'$ mode in a first state of polarization and transmits the $S'-A'$ mode in a second state of polarization.

12. An optical switching matrix between nXn light wave guides comprising nXn switching elements as claimed in any one of claims 8-11.

* * * * *